W. W. Armington,

Blacking Holder and Cutter.

Nº 53,724. Patented Apr. 3, 1866.

Witnesses.
John H. Shumway
M. A. Hine

Inventor.
Wm W Armington
By his atty John E. Earl

UNITED STATES PATENT OFFICE.

WILLIAM W. ARMINGTON, OF MERIDEN, ASSIGNOR TO HIMSELF AND STEPHEN L. USHER, OF NEW HAVEN, CONNECTICUT.

IMPROVED STOVE-BLACKING CUTTER.

Specification forming part of Letters Patent No. 53,724, dated April 3, 1866.

*To all whom it may concern:*

Be it known that I, WILLIAM W. ARMINGTON, of Meriden, in the county of New Haven and State of Connecticut, have invented a new and useful Stove-Blacking Cutter; and I do hereby declare the following, when taken in connection with the accompanying drawings, and the letters of reference marked thereon, to be a full, clear, and exact description of the same, and which said drawings constitute part part of this specification, and represent, in—

Figure 1:
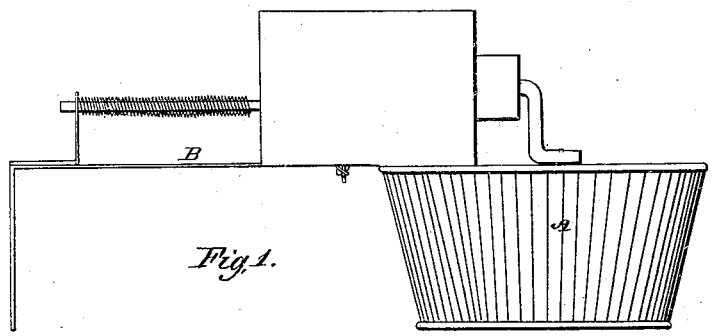
Figure 2:
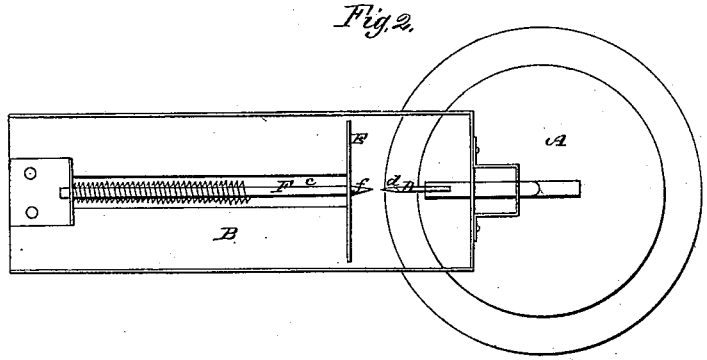
Figure 3:
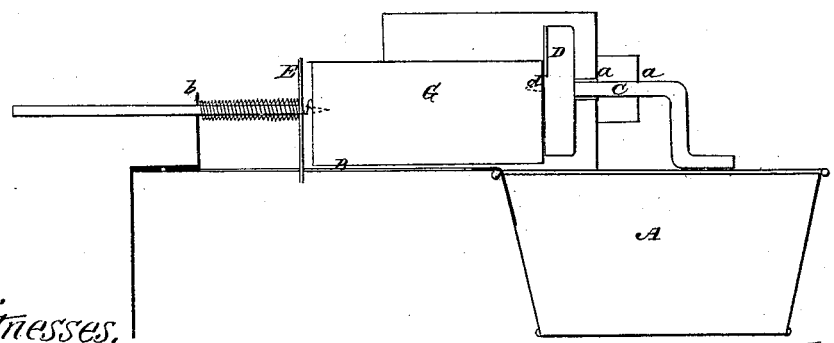

Figure 1, a side view; Fig. 2, a top view, and in Fig. 3 a longitudinal vertical central section.

My invention is designed to facilitate the preparation of stove-blacking for use—that is to say, such blacking as is prepared for market in sticks or cakes; and it consists in a self-feeding device, in combination with a cutter and pan, so that by the operation of the cutter the blacking is shaved or cut from the stick or cake into the pan, where it may be further prepared for use.

To enable others skilled in the art to construct and use my improvement, I will proceed to describe the same as illustrated in the accompanying drawings.

A is the pan; B, the frame attached to the said pan, supporting in bearings $a$ $a$ crank-shaft, C, to which is attached a cutter, D, which said cutter may be of any convenient form so as to be revolved by the crank. A point, $d$, is formed upon the center of the said cutter.

E is the follower, guided by a spindle, F, resting in a bearing, $b$, and by a slot, $c$, in the frame B. The said follower is also provided with a point, $f$, similar to the point $d$ on the cutter. A spiral spring on the spindle, F, denoted in red, presses the follower toward the cutter. This completes the construction of my machine.

Its operation is as follows: Place a stick or cake of blacking, G, between the follower E and the cutter D, the follower being drawn back for the purpose. Press the point on the follower into the blacking, then turn the cutter by means of the crank. The point $d$ will work its way into the blacking, and the cutter shave or cut the required quantity into the pan A in a finely-pulverized state, where it may be prepared for use in the usual manner.

If preferred, the cutter may be made stationary and the follower formed with two points, or an equivalent therefor may be arranged by applying a crank thereto so as to revolve the blacking instead of revolving the cutter, as described; yet I prefer the revolving cutter.

Having, therefore, thus fully described my invention, what I claim as new and useful, and desire to secure by Letters Patent, is The follower E, and the cutter D, constructed and arranged to operate substantially in the manner herein described, in combination with the pan A, or its equivalent, for the purpose specified.

WILLIAM W. ARMINGTON.

Witnesses:
JOHN E. EARLE,
M. A. HINE.